(12) United States Patent
Crist

(10) Patent No.: US 7,296,993 B2
(45) Date of Patent: Nov. 20, 2007

(54) POPPET VALVE ASSEMBLY

(76) Inventor: Daniel E. Crist, 14292 Bent Tree Ct., Strongsville, OH (US) 44136

( * ) Notice: Subject to any disclaimer, the term of this patent is extended or adjusted under 35 U.S.C. 154(b) by 378 days.

(21) Appl. No.: 10/970,636

(22) Filed: Oct. 22, 2004

(65) Prior Publication Data
US 2006/0088624 A1    Apr. 27, 2006

(51) Int. Cl.
*B29C 45/52* (2006.01)

(52) U.S. Cl. ...................... 425/562; 425/563

(58) Field of Classification Search ................ 425/562, 425/563
See application file for complete search history.

(56) References Cited

U.S. PATENT DOCUMENTS
2,345,917 A * 4/1944 Coffman ..................... 425/563

* cited by examiner

*Primary Examiner*—Tim Heitbrink
(74) *Attorney, Agent, or Firm*—James A. Hudak

(57) ABSTRACT

A check valve assembly for use in a plastic injection molding machine injection unit is disclosed. The check valve utilizes a free-floating poppet member which has tapered angularly spaced-apart tapered flutes on the outer surface thereof and a self-aligning spherical valve seating surface at one end thereof. When a predetermined shot volume in front of the check valve has been filled, forward advancement of the feed screw within the injection unit causes the molten thermoplastic material to grippingly engage the tapered surfaces of the flutes causing the poppet member to move along with the backflow of thermoplastic material closing the check valve.

8 Claims, 4 Drawing Sheets

POPPET VALVE ASSEMBLY

The present invention relates, in general, to a poppet valve and, more particularly, to an improved poppet valve assembly for use in a plastic injection molding machine where precise shot control is critical.

BACKGROUND ART

The plastic injection molding process typically utilizes two phases or stages—a plasticizing phase or stage followed by an injection phase or stage. Plastic injection molding machines usually utilize a heated barrel in order to plasticize or transform pelletized or granular thermoplastic material into the molten state. The barrel has a reciprocating auger-type feed screw mounted therein which forces the molten thermoplastic material through the outlet end of the barrel for injection into a die. During the plasticizing phase or stage, the feed screw rotates and forces the pelletized or granular thermoplastic material toward the forward end of the screw and barrel. As the pelletized or granular thermoplastic material flows toward the forward end of the feed screw and barrel, it is transformed into the molten state by a combination of frictional heat generated by the movement of the thermoplastic material against the screw and the inner surface of the barrel and conductive heat transferred through the wall of the barrel from electrical resistance heaters mounted on the exterior of the barrel. Continued rotation of the feed screw results in the molten thermoplastic material flowing to the end of the screw where it passes through a check valve into a cavity. As the molten thermoplastic material is received within the cavity, a differential pressure develops across the ends of the feed screw causing the feed screw to move toward the feed end of the barrel while the screw rotates. After a predetermined volume of "shot" of molten thermoplastic material is received within the cavity in front of the check valve, rotation of the feed screw is stopped by associated controls. The injection phase or stage then commences causing the feed screw to move forward toward the end of the barrel whereupon the check valve closes in response to flow of molten thermoplastic material. The "shot" of molten thermoplastic material now remaining in the cavity end of the barrel is then forced through a nozzle and into the die.

There are a number of commonly used check valves that are responsive to the backflow of molten thermoplastic material in order to close same. These valve types include floating rings, reciprocating balls, and poppets. The poppet styles vary in configuration with some poppets utilizing complicated and failure-prone spring arrangements. Although the valves presently used in the injection molding industry meet with varying degrees of success, there still remains a need for a reliable, fast acting poppet valve in some applications. This is especially true where precise shot control is critical.

In view of the foregoing limitations associated with presently available check valves for use in plastic injection molding machines, it has become desirable to develop a check valve that utilizes a uniquely responsive poppet member that does not require spring loading and wherein the poppet member is configured so that it is significantly more responsive to the backflow of molten thermoplastic material, thus resulting in the rapid closing of the check valve virtually immediately after the commencement of the injection phase or stage.

SUMMARY OF THE INVENTION

The present invention overcomes the problems associated with presently available check valves for plastic injection molding machines, and other problems, by providing a check valve that utilizes a highly responsive, free floating, self-aligning poppet member that is configured so that it is substantially more sensitive to the backflow of molten thermoplastic material than presently available check valves. The poppet member utilized by the check valve of the present invention has angularly spaced-apart tapered flutes on the outer surface thereof permitting molten thermoplastic material to flow through the flutes to fill the cavity in front of the check valve. When the cavity in front of the check valve is full, the commencement of the injection stroke causes the molten thermoplastic material to attempt to backflow through the angularly spaced-apart tapered flutes causing the check valve to close. The thermoplastic material grippingly engages the angularly spaced-apart tapered flutes on the poppet member resulting in virtually no relative movement between the backflow and the poppet member causing the poppet member to move with the backflow into sealing engagement with the check valve seat. A spherical valve seating surface provided on the poppet member allows for precise and repeatable sealing engagement with the check valve seat even if the poppet member is not in longitudinal alignment with same.

DESCRIPTION OF THE PREFERRED EMBODIMENT

Figure 1:
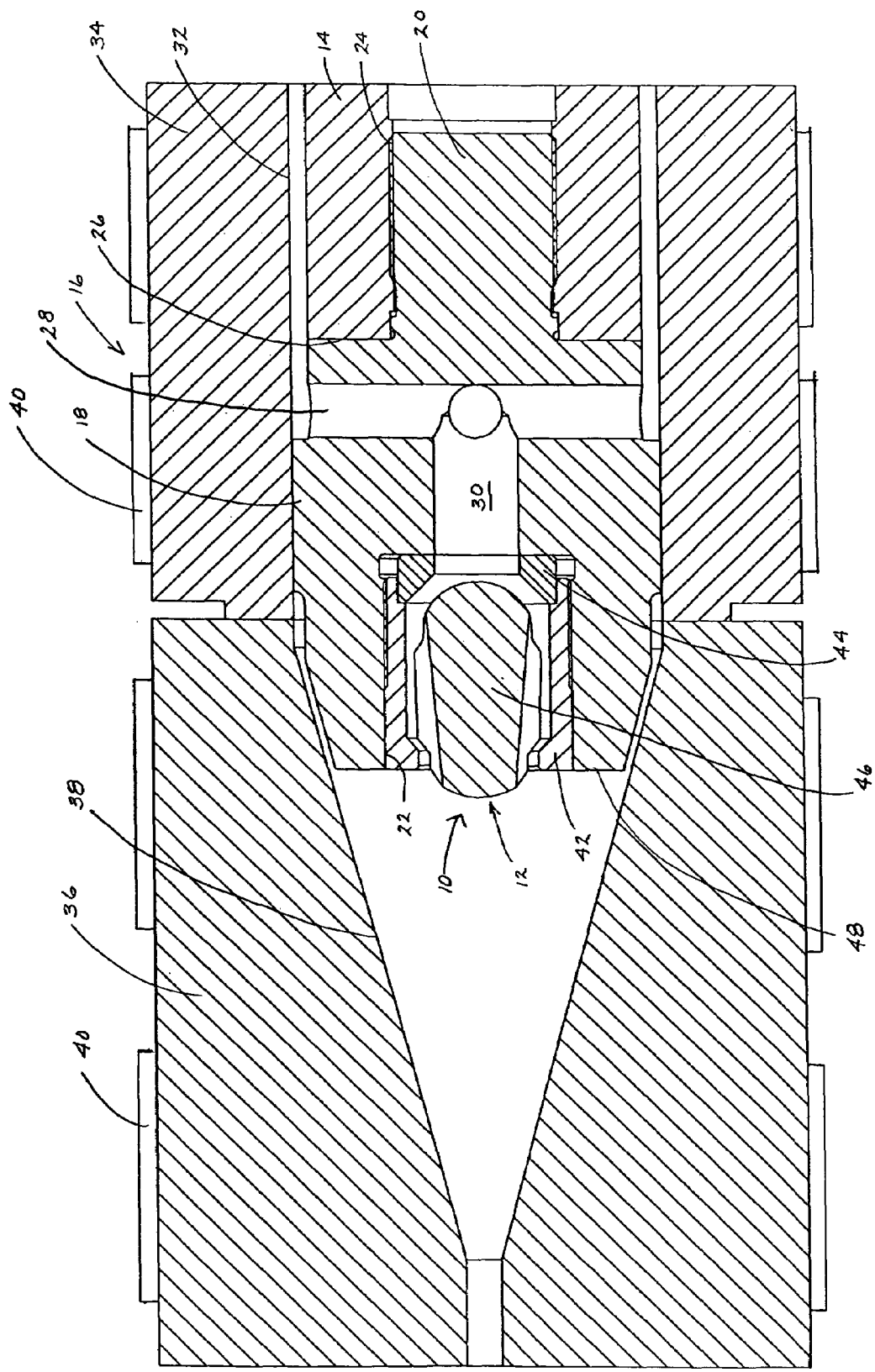
FIG. 1 is a cross-sectional view of a front discharge valve containing the poppet valve assembly of the present invention and illustrates the attachment of the front discharge valve to the end of the feed screw within the outlet portion of a conventional plastic injection molding machine.

Referring now to the drawings where the illustrations are for the purpose of describing the preferred embodiment of the present invention and are not intended to limit the invention disclosed herein, FIG. 1 is a cross-sectional view of a front discharge valve 10 containing the poppet valve assembly 12 of the present invention and illustrates the threaded attachment of the front discharge valve 10 to the end of a feed screw 14 within the injection unit 16 of a conventional plastic injection molding machine. The front discharge valve 10 is comprised of a body member 18 having a substantially cylindrical cross-section with a reduced diameter threaded portion 20 adjacent one end thereof and a blind bore 22 within the oppositely disposed end thereof. The reduced diameter threaded portion 20 is threadably received within a threaded blind bore 24 in end 26 of feed screw 14. The blind bore 22 within body member 18 is sized so as to receive the poppet valve assembly 12 of the present invention and fluidically communicates with the molten thermoplastic material by a plurality of equally angularly spaced-apart cross-bores 28 in body member 18, each of which joins a longitudinally extending through bore 30 in body member 18. Body member 18 and feed screw 14 are received within the bore 32 of an outlet barrel 34 in a conventional plastic injection molding machine. A barrel end cap 36 having an inwardly tapered conical surface 38 therein is attached to the outlet end of the outlet barrel 34 and functions to transfer molten thermoplastic material to a die (not shown). A nozzle (not shown) is attached to the outlet of end cap 36. A plurality of heater bands 40 are mounted around the outer surface of end cap 36 and outlet barrel 34 and are utilized to assist in the melting of the pelletized or granular thermoplastic material and to keep the aforementioned material in the molten state as it is being delivered by the feed screw 14.

The poppet valve assembly 12 is comprised of a holder 42, an insert 44 received within one end of the holder 42 and a poppet member 46 slidingly movable within the holder 42. The holder 42, insert 44 and the poppet member 46 are received within blind bore 22 in the outlet end 48 of body member 18 of front discharge valve 10.

Figure 2:
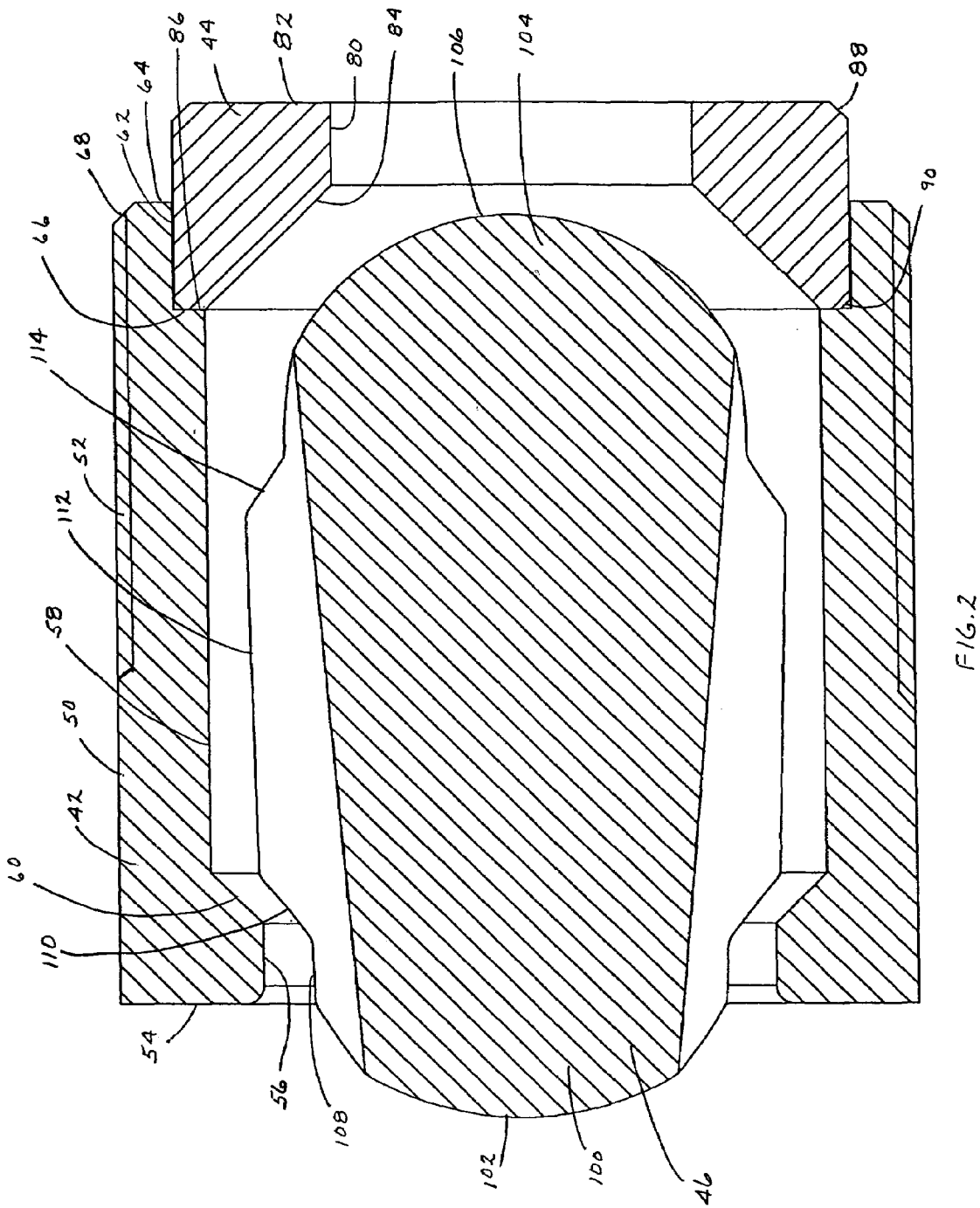
FIG. 2 is a cross-sectional view of the poppet valve assembly of the present invention.

Referring now to FIG. 2, which is a cross-sectional view of the poppet valve assembly 12, the holder 42 is generally cylindrical in cross-section and has a substantially smooth outer surface 50 that terminates in a threaded outer surface 52. One end 54 of the holder 42 has a bore 56 therein which communicates with one end of a through bore 58 within holder 42 by means of a substantially continuous tapered surface 60. The other end of through bore 58 communicates with a blind bore 62 in the oppositely disposed end 64 of holder 42. A substantially continuous shoulder 66 is provided at the junction of blind bore 62 and through bore 58. A chamfer 68 is provided on the end 64 of the holder 42 adjacent the threaded outer surface 52 of the holder 42 to assist in the insertion of the holder 42 within the body member 18. The diameter of bore 56 is less than the diameter of through bore 58 which is less than the diameter of blind bore 62 in holder 42.

The insert 44 is generally circular in cross-section and has a bore 80 provided in end 82 thereof. Bore 80 terminates in a substantially continuous tapered valve seating surface 84 which terminates in oppositely disposed end 86 of insert 44. Chamfers 88, 90 are provided on ends 82, 86, respectively, of insert 44. The outer diameter of insert 44 is slightly less than the diameter of blind bore 62 in holder 42 permitting insert 44 to be received within blind bore 62 in holder 42 and to be positioned therein so that end 86 of insert 44 contacts shoulder 66 in blind bore 62 in holder 42. It should be noted that insert 44 may be an integral part of body member 18.

Figure 3:
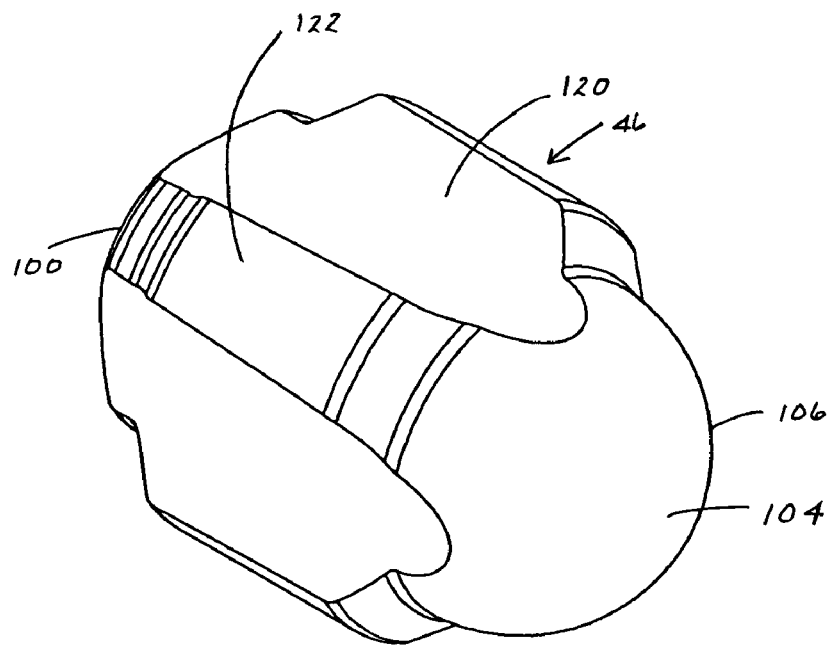
FIG. 3 is a perspective view of the poppet member utilized by the poppet valve assembly of the present invention and illustrates the equally angularly spaced-apart tapered flutes and the adjacent angularly spaced-apart ribs on the outer surface of the poppet member.
Figure 4:
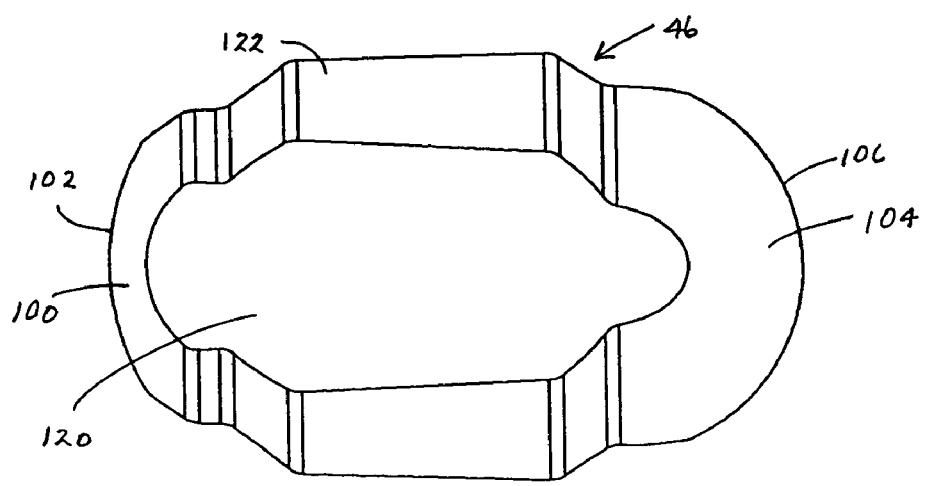
FIG. 4 is a top plan view of the poppet member utilized by the poppet valve assembly of the present invention and illustrates a tapered flute on the outer surface of the poppet member.
Figure 5:
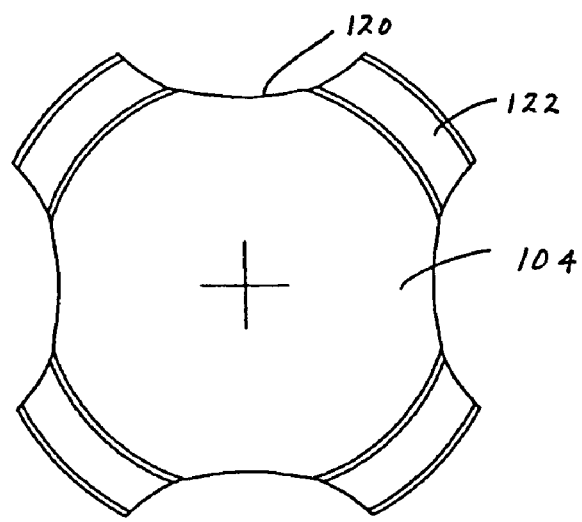
FIG. 5 is a right end elevation view of the poppet member utilized by the poppet valve assembly of the present invention and illustrates the spherical surface thereon.
Figure 6:
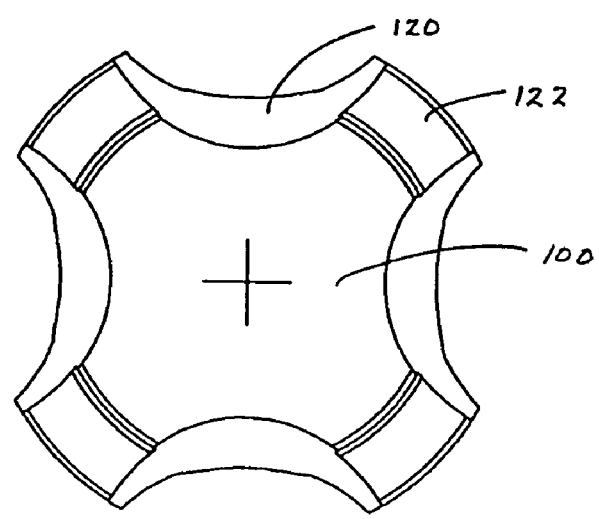
FIG. 6 is a left end elevation view of the poppet member utilized by the poppet valve assembly of the present invention and illustrates the rounded surface thereon.

Poppet member 46 is slidingly received within through bore 58 in holder 42 and is captured at one end thereof by substantially continuous tapered surface 60 in holder 42 and at the other end thereof by continuous tapered valve seating surface 84 on insert 44. Poppet member 46 is substantially circular in cross-section and has an outer diameter slightly less than the diameter of through bore 58 in holder 42 permitting poppet member 46 to be slidingly moveable therein. One end 100 of poppet member 46 has a rounded surface 102 defined by a first radius whereas the oppositely disposed end 104 of poppet member 46 has a spherical surface 106 defined by a second radius. The first radius defining rounded surface 102 is greater than the second radius defining spherical surface 106. End 100 of poppet member 46 defined by rounded surface 102 terminates in a substantially cylindrical surface 108 which, in turn, terminates in a substantially circumferential outwardly tapered surface 110. Circumferentially outwardly tapered surface 110 terminates in cylindrical outer surface 112 of the poppet member 46. The cylindrical outer surface 112 of poppet member 46 terminates in a substantially circumferentially inwardly tapered surface 114. Circumferentially inwardly tapered surface 114 joins cylindrical outer surface 112 with end 104 of poppet member 46 defined by spherical surface 106. As shown in FIG. 3, four equally angularly spaced-apart tapered flutes 120 are provided in the cylindrical outer surface 112 of poppet member 46. The root diameter of the flutes 120 decreases from end 104 to end 100 of poppet member 46 resulting in the formation of four equally angularly spaced-apart ribs 122 which define the cylindrical outer surface 112 of poppet member 46. The equally angularly spaced-apart tapered flutes 120 are outwardly tapered from end 104 to end 100 of poppet member 46. Thus, the transverse width of a flute 120 between two adjacent spaced-apart ribs 122 increases from end 104 to end 100 of poppet member 46 and the transverse width of each rib 122 decreases from end 104 to end 100 of poppet member 46.

The front discharge valve 10 containing the poppet valve assembly 12 is installed in a conventional plastic injection molding machine and the poppet valve assembly 12 operates in the same manner as other ball and poppet style check valves in such molding machines. As the feed screw 14 within the injection molding machine turns and advances molten thermoplastic material through the front discharge valve 10, the flowing thermoplastic material pushes poppet member 46 away from the tapered valve seating surface 84 on insert 44 causing the front discharge valve 10 to open permitting thermoplastic material to flow between flutes 120 on poppet member 46 and the surface defining bore 58 in holder 42. Once the cavity in front of the front discharge valve 10 is full, the feed screw 14 stops turning and moves toward the end cap 36 causing thermoplastic material to be injected into the die and causing pressure to increase in front of the discharge valve 10 which, in turn, causes the thermoplastic material to start moving in the opposite direction through flutes 120 and the surface defining bore 58 in holder 42. The "backflowing" thermoplastic material grippingly engages the poppet member 46 causing poppet member 46 to move with the thermoplastic material which, in turn, causes in spherical end 104 of poppet member 46 to sealingly engage the tapered valve seating surface 84 on insert 44, thus closing the front discharge valve 10.

An advantage provided by the poppet valve assembly 12 of the present invention over similar poppet valve assemblies resides in the tapered surfaces of the spaced-apart flutes 120 which grippingly engage the thermoplastic material as the material starts to backflow through the valve. This increased resistance induced by the tapered flutes 120 causes the front discharge valve 10 to close more rapidly than a typical poppet member having straight cut flutes on the surface thereof. In addition, the utilization of a spherical surface 106 on end 104 of poppet member 46 to engage continuous tapered surface 84 on insert 44 in order to close valve 10 makes the poppet member 46 self-aligning, thus allowing the poppet member 46 to freely float within bore 58 without being precisely longitudinally aligned with bore 80 in insert 44.

Certain modifications and improvements will occur to those skilled in the art upon reading the foregoing. It is understood that all such modifications and improvements have been deleted herein for the sake of conciseness and brevity, but are properly within the scope of the following claims.

I claim:

1. A poppet valve assembly for use in controlling the flow of molten thermoplastic material comprising a holder member having a bore therein, a member having a valve seating surface thereon, and a poppet member received in said bore in said holder member and being slidingly movable therein and being retained therein by said holder member at one end thereof and by said valve seating surface at the oppositely disposed end thereof, said poppet member having an inlet end and an outlet end, said inlet end of said poppet member being substantially spherical in configuration causing said poppet member to be self-aligning with respect to said valve seating surface, said poppet member having a plurality of longitudinally extending fluted surfaces thereon defining a plurality of ribs which slidingly engage the surface defining said bore in said holder member, said fluted surfaces further defining a root diameter which decreases from said inlet end to said outlet end of said poppet member, whereupon said poppet member moves into sealing engagement with said valve seating surface as said molten thermoplastic material enters said outlet end.

2. The poppet valve assembly as defined in claim 1 wherein said fluted surfaces are positioned in a substantially equally angularly spaced-apart relationship around the periphery of said poppet member.

3. The poppet valve assembly as defined in claim 2 wherein the width of said fluted surfaces in the transverse direction increases from said inlet end to said outlet end of said poppet member.

4. The poppet valve assembly as defined in claim 1 wherein said poppetmember is substantially circular in cross-section.

5. The poppet valve assembly as defined in claim 1 wherein said inlet end and said outlet end of said poppet member have a substantially rounded configuration.

6. The poppet valve assembly as defined in claim 1 wherein said member having a valve seating surface thereon comprises an insert member received within one end of said holder member.

7. The poppet valve assembly as defined in claim 6 wherein said insert member has a bore therein terminating in a tapered surface.

8. The poppet valve assembly as defined in claim 7 wherein one end of said poppet member contacts said tapered surface on said insert member to close said poppet valve assembly.

* * * * *